(12) United States Patent
DiSalvo et al.

(10) Patent No.: US 10,140,642 B2
(45) Date of Patent: Nov. 27, 2018

(54) AUTOMATED CUSTOMER ENGAGEMENT AND ISSUE LOCATION, PREDICTION, AND RESPONSE THROUGH UTILIZATION OF PUBLIC AND PRIVATE DATA SOURCES

(71) Applicant: DATA CAPABLE, INC., Wilmington, DE (US)

(72) Inventors: Peter Michael DiSalvo, San Diego, CA (US); Ryan Joseph Zaczynski, Hoboken, NJ (US)

(73) Assignee: DATA CAPABLE, INC., Wilmington, DE (US)

( * ) Notice: Subject to any disclaimer, the term of this patent is extended or adjusted under 35 U.S.C. 154(b) by 346 days.

(21) Appl. No.: 15/218,207

(22) Filed: Jul. 25, 2016

(65) Prior Publication Data

US 2017/0032436 A1    Feb. 2, 2017

Related U.S. Application Data

(60) Provisional application No. 62/197,305, filed on Jul. 27, 2015.

(51) Int. Cl.
*G06Q 30/06* (2012.01)
*H04L 29/08* (2006.01)
*G06Q 50/06* (2012.01)

(52) U.S. Cl.
CPC ......... *G06Q 30/0613* (2013.01); *H04L 67/18* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 7,551,984 B1 | 6/2009 | Fickey et al. | |
| 8,930,455 B2 | 1/2015 | Kan et al. | |
| 9,015,046 B2* | 4/2015 | Pereg | G06Q 10/063 |
| | | | 379/265.01 |
| 2010/0030648 A1 | 2/2010 | Manolescu et al. | |
| 2011/0206198 A1* | 8/2011 | Freedman | G06Q 30/06 |
| | | | 379/265.03 |
| 2011/0282943 A1 | 11/2011 | Anderson et al. | |
| 2012/0011432 A1 | 1/2012 | Strutton | |
| 2012/0179527 A1 | 7/2012 | Ball et al. | |
| 2013/0179568 A1* | 7/2013 | Huang | H04L 43/04 |
| | | | 709/224 |
| 2014/0081998 A1 | 3/2014 | Fan et al. | |

OTHER PUBLICATIONS

Avvenuti Avvenuti et al., "EARS (Earthquake Alert and Report System): a Real Time Decision Support System for Earthquake Crisis Management," 10 pages, KDD'14, Aug. 24-27, 2014, New York, NY, USA.

* cited by examiner

*Primary Examiner* — Mila Airapetian
(74) *Attorney, Agent, or Firm* — Leber IP Law; Dennis R. Haszko

(57) ABSTRACT

An automated method of customer engagement and issue location, prediction, and response that utilizes disparate data sources including social media, weather, news, real estate information, customer account information, and/or asset information to locate and categorize issues, to predict the occurrence of such issues, and to determine/automate operational and customer-related responses to such issues.

20 Claims, 6 Drawing Sheets

AUTOMATED CUSTOMER ENGAGEMENT AND ISSUE LOCATION, PREDICTION, AND RESPONSE THROUGH UTILIZATION OF PUBLIC AND PRIVATE DATA SOURCES

RELATED APPLICATIONS

The present invention claims priority from U.S. Provisional Patent Application No. 62/197,305 filed on 27 Jul. 2015, the contents of which are herein incorporated by reference in its entirety.

FIELD OF THE INVENTION

The present invention relates to using disparate data sources (social media, weather, news, real estate information, customer account information, asset information) to locate and categorize issues, to predict the occurrence of issues, and to determine/automate operational and customer-related responses.

BACKGROUND OF THE INVENTION

In the world of utility service providers such as, but not limited to, electric companies, service disruptions are resolved by a customer contacting the company. More specifically, determination of the exact location of a service outage is often accomplished by asking the customer via a telephone call where they are located. Typically, only customers can report an outage, and they are required to call the utility and give their name, account number, or service address. Operational issues related to the utility service such as an outage, leak, high bill, or any other related issue will also require a significant level of human interaction. Prediction of future operational issues, if done at all, is typically related to high-level weather data alone—e.g., warnings of high wind in advance of hurricane tracking.

Due to the myriad of utility service providers, there also exists a wide variety of outage data in different proprietary formats. Because the information is structured in a proprietary format, there is a difficulty in sharing such data with third parties such as government, first responders, etc. Currently, damage assessment information (e.g., text, photos, location, etc.) is provided via tedious manual processes often involving telephone calls from company employees, first-responders, or customers. Likewise, event coordination among non-employees such as first-responders, employees of another company, or the general public is typically a manual process and varies widely by company.

In terms of determining public sentiment about a particular utility service provider, this is typically accomplished, if at all, by a marketing department using methods such as telephone polling or written surveys. To a limited extent, some use of social media management in this regard exists for example by analytics software provided by Hootsuite Media Inc. of Vancouver, BC, Canada.

Standard telephone interactions between utility service providers and their customers can be problematic for several reasons. For example, processing operational issues via typical telephone reporting presents possible language barriers inherent to verbal communications. This often requires labor intensive human interaction via a phone call, multilingual employees, and/or the use of a translation service. Telephone interaction may also trigger an internal, company-driven procedure such as a service restoration action, an audit in response to a high-bill complaint, providing a coupon or credit, or similar business practice. However, processing of such procedure remains based in human interaction between the customer and company representative.

In relation to fraudulent and/or other criminal activity related to operational issues, these sorts of events are typically identified only when a customer calls to complain or when a company employee discovers the problem.

Telephone based reporting often remains limited in context. That is to say, information is currently gathered via a manual process for an entire service territory and service provider responses are usually company-wide, rather than specific to a geographic region.

The advent of computers has given rise to Outage Management System (OMS) tools. An OMS is basically a computer system used by operators of electric distribution systems to assist in restoration of power. However, limitations exist with regard to OMS tools. For example, data entered into an OMS by a call center employee that a particular service address is reporting a power outage may result in the OMS "guessing" where other outages are likely to occur based on the company's existing Geographical Information System (GIS), which explains the physical connectivity of the system. Such "guesses" can often be unreliable especially in a dynamic environment such as a progressing storm or natural disaster. Product and service providers of traditional OMS tools include: General Electric Company of Schenectady, N.Y., USA; Siemens AG of Berlin, Germany; Ventyx, an ABB Ltd. Company of Zurich, Switzerland, Telvent, a Schneider Electric Company of Seville, Spain; Harris Computer Corporation of Nepean, Ontario, Canada; and Intergraph Corporation of Madison, Ala., USA.

As mentioned, many of these solutions are based on a manual, telephonic interaction with a customer (meaning, a customer must call the company for the company to know there is an issue). Furthermore, the aforementioned solutions do not use social media as an operational tool, nor do they use online news feeds, or other data set to identify, categorize, and assist with determining the appropriate response. It would be advantageous to obviate or mitigate this and the above mentioned disadvantages.

SUMMARY OF THE INVENTION

According to a first aspect of the invention there is provided a method for automatically processing issues pertinent to a utility provider, the method including: collecting data from an online information source and filtering the collected data by keyword association to generate raw social data; storing the raw social data in a database; classifying the raw social data in accordance with a text classifier; providing burst detection among one or more data sets including the raw social data; extracting at least one identifiable instance of a utility issue from the one or more data sets by way of frequency-based criteria; and reporting at least one actionable solution based upon the identifiable instance.

According to a second aspect of the present invention there is provided a computer program product stored in a non-transitory computer readable medium for processing instances of utility issues across a network, the computer program product including software instructions which, when run on the network causes the network to: collect data from an online information source and filtering the collected data by keyword association to generate raw social data; store the raw social data in a database within the network; classify the raw social data in accordance with a text classifier; provide burst detection among a data set including the raw social data; extract at least one identifiable instance of a utility issue from the one or more of the data sets by way of frequency-based criteria; and report at least one actionable solution based upon the identifiable instance via a user interface of the network.

The present invention provides rapid response to customers of a utility provider via an automated ability to rapidly, within seconds, identify (regardless of language), categorize, and respond to customer or operational issues using social media, news, weather, etc. This allows a utility provider to significantly enhance their operational performance and response-time, reduce the costs to identify and respond to issues, and enhance the customer experience with tailored, rapid reactions to events.

The present invention provides detection and prediction of power outages using social media data to both detect outage events in real-time, and predict future outage events based on a number of features accessible to the methodology of the invention including: social media posts' context and syntax, weather information, and grid-level data supplied directly from utility provider's local networks.

The present invention uses social media, RSS news feeds, SMS/MMS, and other data to:
 i. Identify, categorize, and respond to operational or customer issues in near real time, regardless of language;
 ii. Determine customer sentiment;
 iii. Perform damage assessment;
 iv. Determine customer preferences and needs;
 v. Provide tailored responses to customers; and
 vi. Coordinate responses among company employees, another company's employees, first-responders, and the general public Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
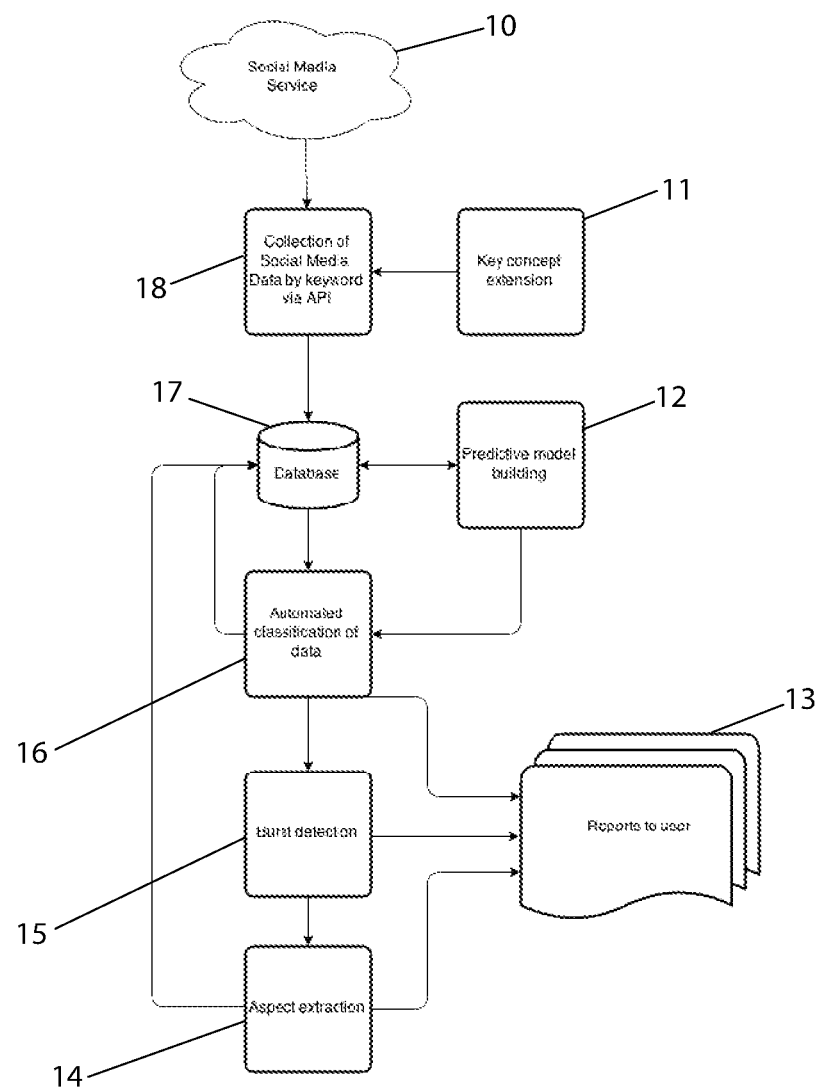
FIG. 1 is a flowchart illustrating the predictive analytics aspect of the present invention.

The present invention will be discussed in the context of a provider of electricity. However, it should be readily apparent that any utility service provider may benefit by application of the present invention. This invention solves several problems related to identifying and responding to various issues which may be characterized as either operational issues or customer-related issues. Operational issues may include location, type, forecasting/prediction of utility problem(s), identity of customer(s), proprietary nature of related data, damage assessment information from varied sources, response coordination, and any other operations-centric issue, related problem, or metric. On the other hand, Customer-related issues are more service-centric and may include public sentiment, language barriers, customer preferences, fraud or other illicit activity, geographically-related problems, and any other customer oriented or service-centric issue.

Overall, the present invention eliminates the need for typical telephonic interaction (i.e., verbal human) between a customer and their utility provider.

The present invention determines via an automated process the exact location of a service outage based on the use of social media, mapping software, and location information from a customer's cellular device or social media account. This is accomplished without asking the customer via a telephone call where they are located.

In accordance with the automated process of the invention, the identity of a person who is having an issue with service is determined regardless of whether the person is a current customer, is (or isn't) at the residence or place of business where the service account is held, or is not a current customer but is currently in a utility's service territory. In this manner, anyone may effectively report an outage without the need to call the utility provider and without any name, account number, or service address given.

The process of the present invention provides an automated method of categorization of an operational issue based on the use of keywords. Examples of such keyword may terms like "outage," "leak," "high bill," or the like. Moreover, such keywords may be in any language—e.g., English ("power out"), Spanish ("sin electricidad").

The present inventive method includes forecasting future operational issues using a combination of social media, weather data, and news (RSS) to increase prediction accuracy.

The present inventive method gathers a variety of outage data in different proprietary formats, reprocesses such varied data, and outputs the data via a standards-based format. Such standardized output may therefore be readily shared and used by not just different utility companies, but also shared and used among third parties including government, first-responders, and the like.

The present inventive method may also gather damage assessment information (including, but not limited to, textual, photographic, and/or locational information) via an automated process from a variety of sources (including, but not limited to, company employees, first responders, and/or customers). Within the scope of the present invention, such data may be appended to outage management or workforce management tools (e.g., OMS), thereby enhancing a utility provider's ability to rapidly identify the issue(s), respond appropriately, and coordinate across a variety of departments and companies (internal or external) in an automated manner.

The present inventive method facilitates rapid and efficient event coordination among non-employees such as first-responders, employees of another company, or the general public. Moreover, the present inventive method may utilize any advanced mobile cellular device (i.e., "smart phones") in order to automatically identify, categorize, track, and respond to issues regardless of whether the respondent is an employee of the utility company or not.

The present inventive method determines public sentiment about a company in real-time. This occurs by automatically mining social media and news feeds (e.g., Rich Site Summary (RSS) feeds) for key words and processing such key words so as to characterize them as representing positive, neutral, or negative sentiment about a company. Using such sentiment determinations, the present inventive method further automatically categorizes customer issues, tracks the real-time impact of issues on a company's brand, and identifies opportunities for improving such sentiment.

As previously mentioned, the present inventive method determines a customer's issues via an automated process regardless of whether they use English ("power out"), Spanish ("sin electricidad"), or another language. Accordingly, the instant method mines social media for keywords and categorizes events and characterizes sentiment regardless of language spoken.

The present inventive method uses automated keyword analysis and sentiment determinations so as to identify customer's preference for a particular product, need for a solution, or desire to have some form of interaction with the company. This includes the ability to trigger an internal, company-driven procedure (like a service restoration action or an audit in response to a high-bill complaint); generate a coupon or credit; and/or respond via social media, email, Short Message Service (SMS)/Multimedia Message Service (MMS), or phone. This automated process of the present invention therefore avoids the need for telephonic interaction with the customer as this is accomplished in real-time whenever the inventive method identifies and processes a customer publishing something about the company on social media or the like.

The present inventive method identifies fraudulent and illicit or otherwise criminal activity by automatically tracking, detecting, and identifying such behavior via social media.

The present inventive method identifies and categorizes issues based on regions. Such regions may be pre-defined or customer-defined geographical regions. Further, responses to any given issue(s) may be varied by region. This allows the utility company to match their tracking and response to issues with their own internal geographical divisions or any other custom-defined region.

Accordingly, the present inventive method drastically improves a utility company's existing operational and customer-centric processes by moving away from manual, phone call interaction with a customer to real-time automation harnessing the interoperability of data shared across systems and hardware. Unlike existing solutions, the present invention does not rely on GIS to "guess" where other outages are occurring. Rather, the present invention mines social media, online news feeds, mobile apps, and other data sources to determine the exact location of an issue, the category of issue, and assists with determining the appropriate response.

The present invention improves upon prior solutions that may in part perform issue identification, categorization, and response assistance by avoiding any need for direct manual interaction with the affected customers in order to identify and categorize events. In this way, the present invention serves to augment existing enterprise outage management, customer engagement, billing, workforce management, security, and damage assessment software by quickly and automatically processing data from a variety of data sources for the benefit of a utility service provider as further explained herein below.

With regard to the construction and operation of the present invention, several primary components will now be discussed with regard to FIG. 1. A prerequisite to the present invention includes data that may be generally termed as "information in the cloud" or "Internet-based data." Such information/data may be any online information source including, but not limited to, social media (e.g., Facebook, Twitter, LinkedIn, Instagram), building/real estate information, RSS news feeds, geographical information, weather, mobile phone applications, cell phone text and image messages (SMS/MMS), network information, enterprise applications, and other data sources. This is represented in FIG. 1 by the cloud labeled Social Media Service 10. It should be understood that while the inventive method uses the information from Social Media Service, the present invention presupposes the existence of such information. The remaining components of the present invention are illustrated in the remainder of the flowchart shown in FIG. 1.

As should be readily understood, the present invention is implemented in software as is known in the computer programming art and will be discussed in terms of modules as illustrated. FIG. 1 is a flowchart which illustrates the predictive analytics of the present invention. Here, a collection module 18 for collection of social media data is provided and which extracts information from the Social Media Service cloud. In this way, the collection module mines or otherwise gathers targeted data from the Social Media Service cloud. The relevance of such targeted data is determined by keyword association by way of an application programming interface (API) in conjunction with a concept module 11. The concept module includes a key concept extension operable with the API to enable the collection module to extract information corresponding to keywords.

Figure 2:
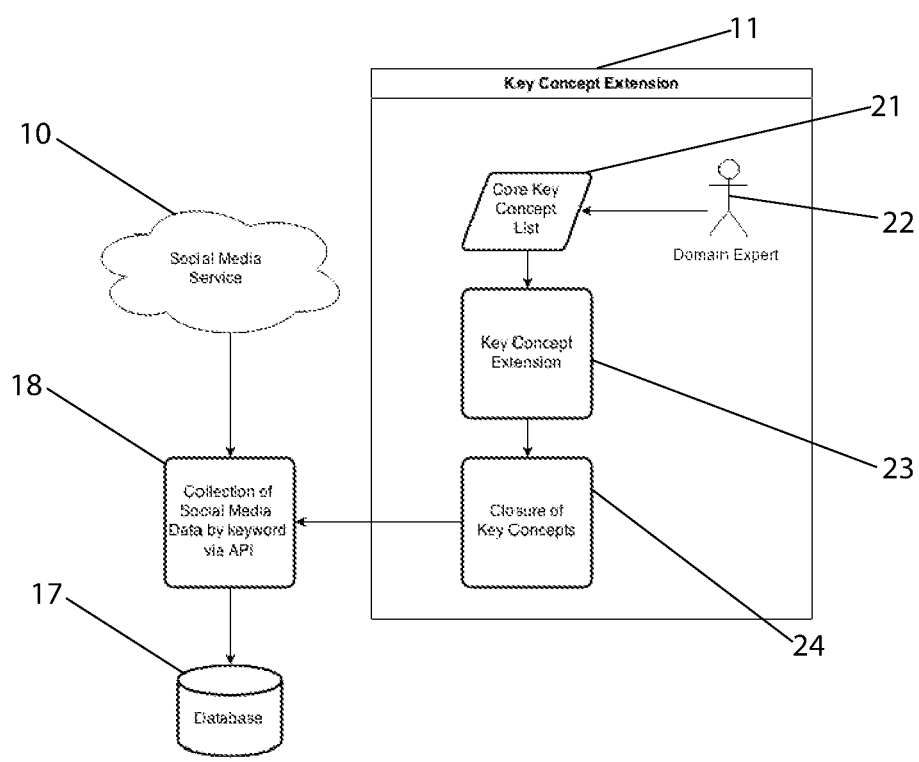
FIG. 2 is a flowchart illustrating the key concept extension stage of the present invention.

The concept module is illustrated in more detail with regard to FIG. 2 which shows a flowchart illustrating the key concept extension stage of the present invention. Here, a domain expert 22 will predetermine a core list 21 of key concepts. For example, representative key concepts may include "power line down from auto accident" or "brown out due to heat wave." Such core key concept list thus processed by the extension 23 providing closure of key concepts 24 which may then be used in the aforementioned keyword association.

With continued regard to FIG. 1, once the collection module extracts relevant data from the Social Media Service cloud by keyword association this raw social data is stored within a database 17 for subsequent automated processing. This processing involves four additional modules including a predictive module 12 for predictive model building, a classification module 16 for automated classification of mined data, a burst module 15 for burst detection which identifies periods of increased activity relative to the mined data, and an aspect module 14 for extracting issues (e.g., operational or customer) identified as pertinent to the utility provider.

Figure 3:
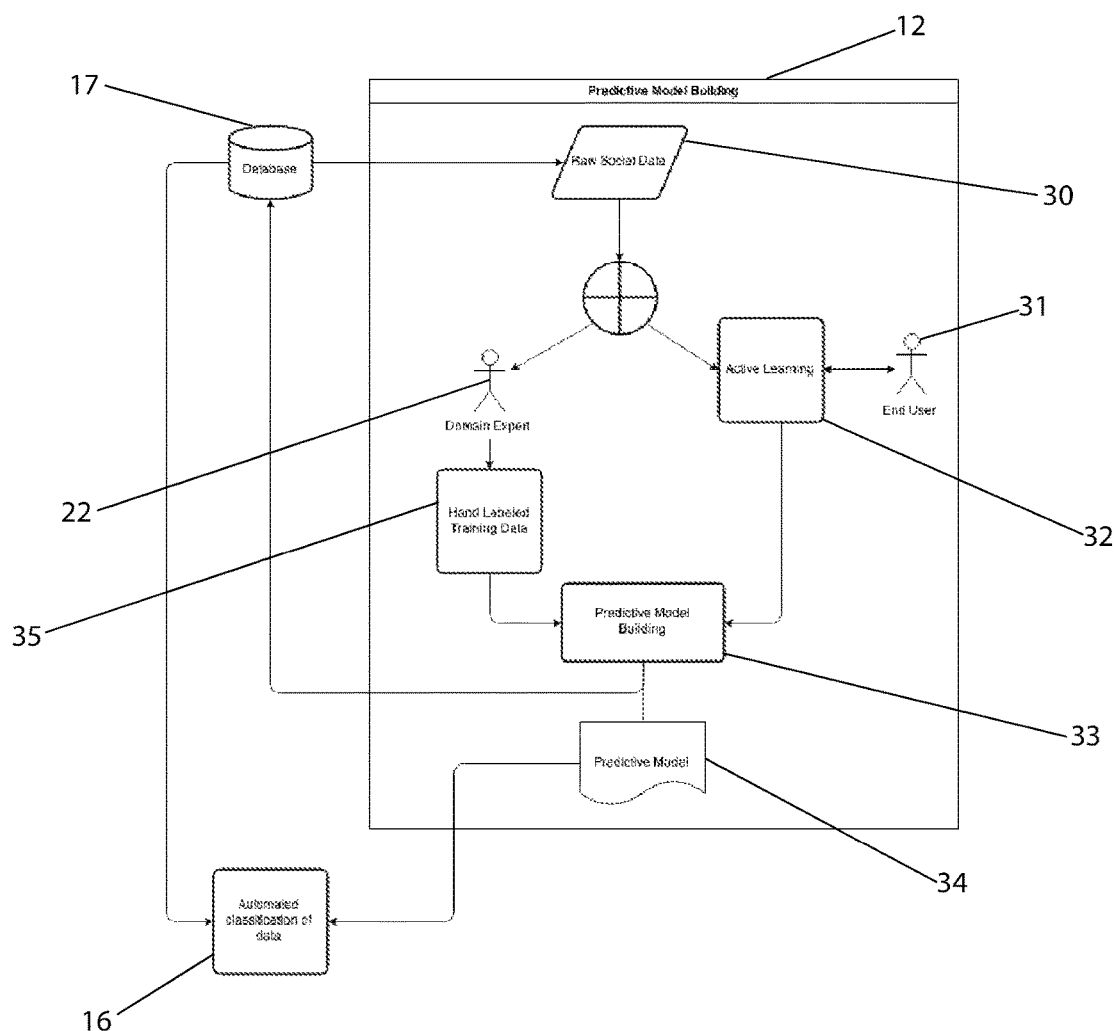
FIG. 3 is a flowchart illustrating the predictive model building stage of the present invention.

With regard to FIG. 3, the predictive module is illustrated in terms of the predictive model building stage. Here, raw social data 30 (i.e., data which has been mined and collected to the database by keyword analysis only) is subjected to further processing by either active learning 32 or hand labeled training data 35. Active learning is accomplished by interaction with the user 31 (i.e., utility provider personnel) who, for example, might characterize raw data related to a group of keywords with a specific type of event. Hand labeled training data would be accomplished by pre-loading data associations of known keywords and corresponding known types of events. Through both active learning and hand labeled training, predictive model building 33 is accomplished to produce a predictive model 34 of keywords and events. Such predictive model is used by the classification module described further with regard to FIG. 4.

Figure 4:
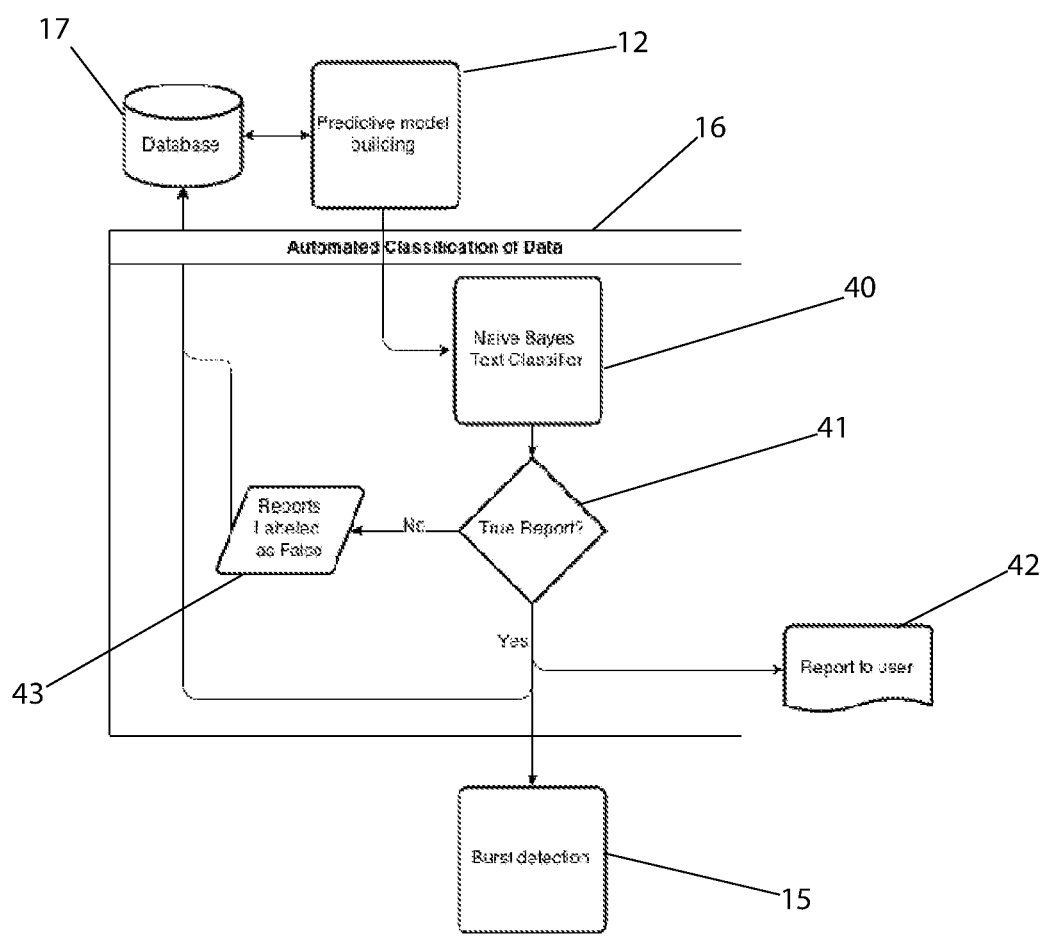
FIG. 4 is a flowchart illustrating the automated event classification stage of the present invention.

The automated event classification stage is illustrated by way of FIG. 4. Here, the stored data is automatically classified using a Naive Bayes text classifier 40 which is a known technique for constructing classifiers in the art of text retrieval and will not be further discussed herein. The data processed by the Naive Bayes text classifier is then determined to be a true or false report at 41. False reports are labeled at 43 as such to improve integrity of information in the database, while true reports may be provided to the user via reporting at 42. Such true data is subjected to further processing by the burst module as described with regard to FIG. 5.

Figure 5:
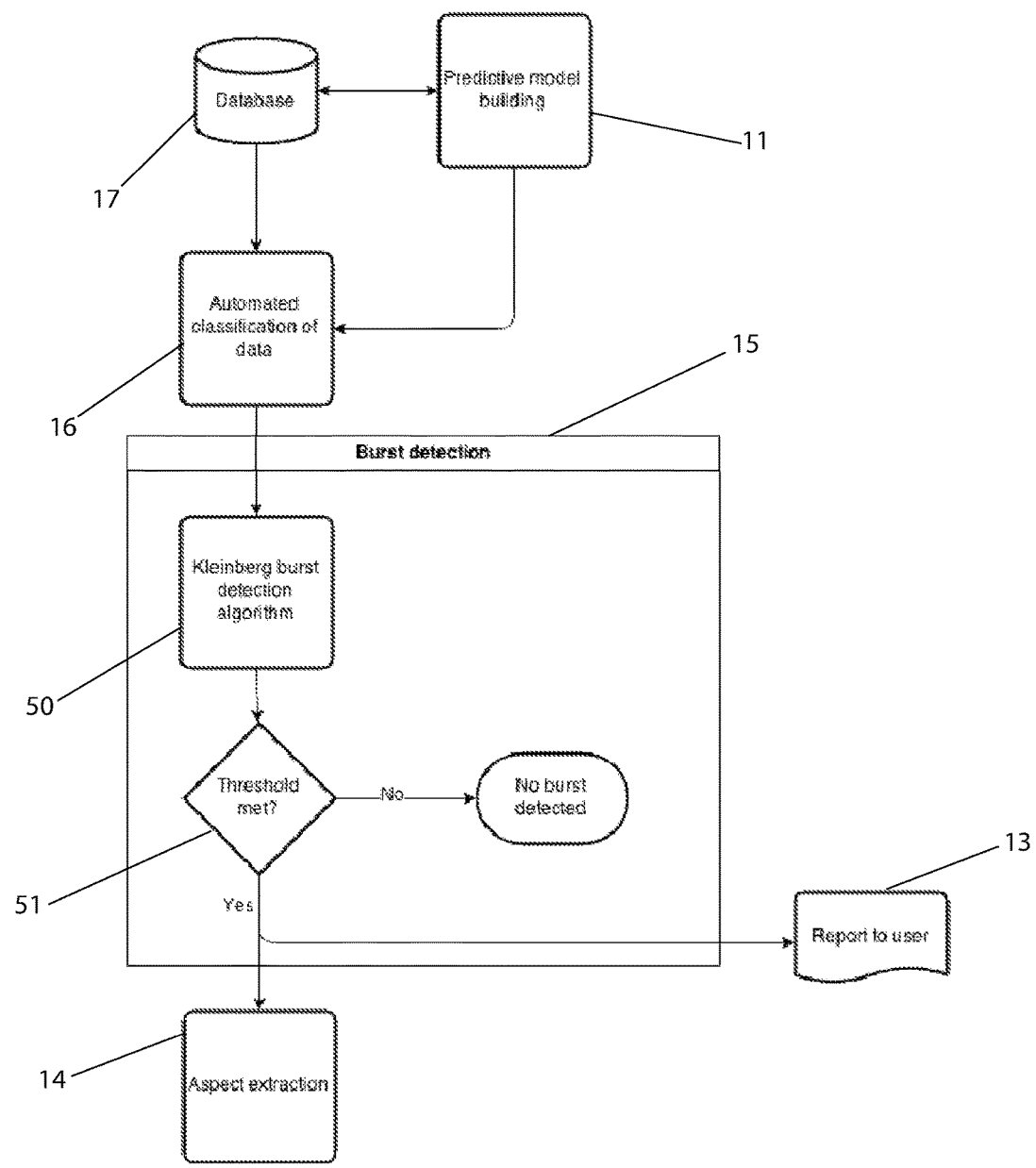
FIG. 5 is a flowchart illustrating the burst detection stage of the present invention.

The burst detection stage is illustrated by way of FIG. 5. Here, stored data is automatically assessed for veracity in terms of determining burstiness. Burstiness is a well-known phenomenon in many real-world networks such as email or other human communication networks and analysis of such offers a more faithful representation of reality and highlights patterns or may diminish them. The data processed by the classification module is therefore subjected to a Kleinberg burst detection algorithm 50 which is a known technique of determining burstiness. Upon a predetermined threshold of burstiness being met at 51, such outcome may then be reported to the user which would of course indicate a corresponding period of increased activity relative to the mined data. While this alone may be of some value, the data is further subjected to the aspect module as further described with regard to FIG. 6.

Figure 6:
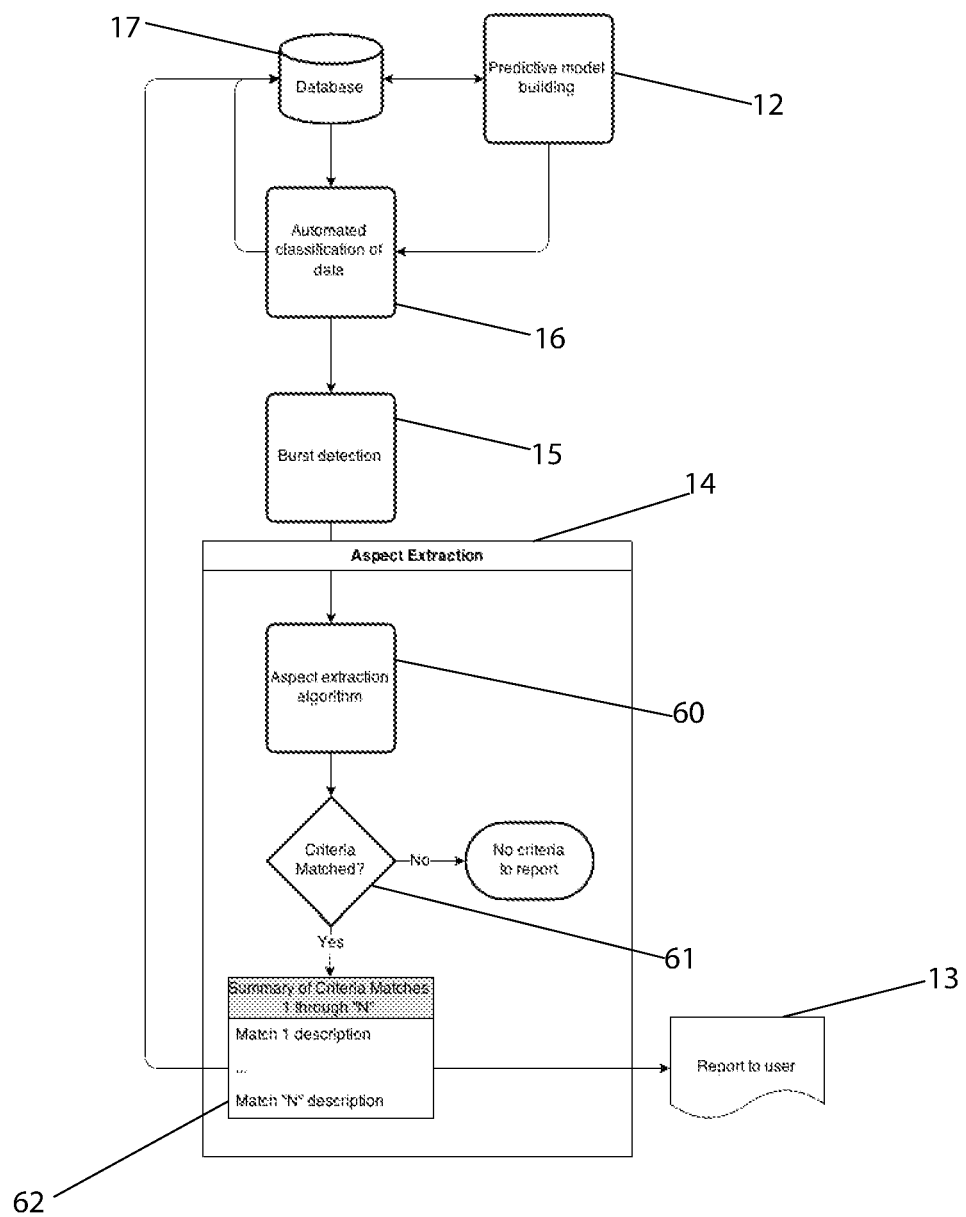
FIG. 6 is a flowchart illustrating the aspect extraction stage of the present invention.

The aspect extraction stage is illustrated by way of FIG. 6. Here, the processed data is further subjected to an aspect extraction algorithm 60. Aspect extraction algorithms are well known within the art of data mining and may include, for example, frequency-based criteria in order to identify patterns within large amounts of data. The processed data is matched at 61 against such criteria and, if matched, a summary of criteria matches 1 through N, where N is the number of predetermined descriptions at 62 is reported to the user while also updating the database accordingly with criteria matched data.

As already suggested, the collective output of the classification module, burst module, and aspect module includes reports to the user (i.e., the utility service provider or entity monitoring on behalf of the utility service provider). Such reports may be customized in any appropriate manner to satisfy the user's needs and may include textual reporting, visual reporting, audio reporting or any combination thereof and by any appropriate means such as, but not limited to, a computer graphical user interface (GUI), electronic mail, text messaging, automated phone notification, or any combination thereof. As an alternative to instantaneous reports, the collective output may be stored in a database and displayed to the user via a web based user interface (UI). The UI is designed in such a way that it aggregates the massive amounts of data into easily readable and understandable charts and graphs. The user can filter the data and drill in on a specific type of data (e.g., customers who are angry about a power outage that occurred between 10 am and 11 am and were in Downtown). The user may then, for example, create a message and respond to these customers individually or as a group.

In this manner, the mined data is analyzed by way of the inventive method for a variety of reporting purposes including, but not limited to, to:
  i. determine the location of the report;
  ii. categorize the type of event being reported;
  iii. classify the customer sentiment of the report;
  iv. detect customer needs;
  v. predict likely causes and create damage assessments;
  vi. identify and validate weather conditions; and
  vii. determine building type where event was reported For purposes of the present invention, the term "event" may refer to any occurrence that impacts upon the utility operator's brand, delivery of services, cyber or physical security, workforce management, grid-related issues (e.g. power quality, gas/water leakage, traffic accidents, outages, and demand growth), customer sentiment, or any other related criteria. By way of the present invention, such events may be identified, classified, geographically located and analyzed: to determine the proper response action, to generate a response action in an automated fashion, to share with other software systems applications (e.g., OMS), and to otherwise report to the appropriate party or parties (e.g., utility provider management, emergency personnel, or the like).

In order to identify and classify an event, metadata (e.g. latitude, longitude, user city, user state, user zip code, user nation, elevations, user preferences, time and date, and weather at time of event) is appended to the raw data sets to determine the specific location of an event. Such appended data set would then be stored in the database. This specific event data may then be shared with additional systems (not illustrated) for localization of the event. This includes using geographic data being supplied to network models for additional analysis against other data sets for deeper insight on the given event.

As suggested above, information that has been mined and processed by the inventive method may then be utilized to trigger a manual or automated response and event resolution notification to the customer. Response communications may include specific details, durations, locations, crew response times, asset information, marketing, and customer engagement information and can be targeted to individuals that have been impacted by said event. Additionally, responses may be customized based on information gathered about each customer such as their name, location, hobbies, birthday, friends, contact information, place of residence, and the like.

The present invention therefore serves to mine, capture, and append location-based information (latitude and longitude) to content include capturing a specific corresponding location based on GPS hardware of a cellular device, pulling the location information from a social media post, location information as described in an individual's social media profile, and data appended or included in the post made to social media. Specific location information for SMS may be obtained via contextual analysis of the messages and analysis of the customer's (i.e., specific reporting individual) zip code information. Specific location information for an individual using MMS messaging may be shared via hardware (i.e., cellular device) that is GPS and MMS messaging-enabled. All of these techniques utilize back-end processes and analytics to parse the obtained information for analysis and visualization purposes. Mobile apps, on the other hand, supply specific location information that may be appended or streamed in real-time using GPS-enabled information from the hardware.

Generally speaking, events may be attributed to a wide range of operational occurrences (both foreseen and unforeseen) within or beyond a utility company's service territory. Stakeholders (e.g., customers, private individuals/commentators, etc) may use the platform's numerous methodologies to describe an event, including using a different language, different channels (RSS news feed, social media, SMS, or MMS), the use of keywords (e.g. "outage"), specific tags (e.g. #POWEROUTAGE), cellular location data, and mobile apps used to report and visualize issues. As previously described, social networking sites where data is pulled from may include (but are not limited to), Pinterest, Linkedin, Facebook, Instagram, Google+, Vine, or other public sources of social information. As mentioned, the inventive method then analyzes these sources of data for specific keywords, terms, phrases, hashtags, accounts, and the like. The inventive method then aggregates, analyzes, visualizes, shares, and responds in real-time to the event. This includes the processes by which data is filtered and a determination is made on the applicability of the data to the specific event. This may include the utilization of specific location data, specific user data (trusted), specific mobile apps, and specific inbound cellular data. This also includes the contextual analysis and processes to determine the cause of the event.

Once the event has been identified and categorized, this information can be displayed in a continuous feed, mapping software, report, or analyzed via graphical tools and underlying algorithms that support event understanding. This includes algorithms pertaining to the sentiment of the post as it pertains to the event, the time the event was shared, the location the event occurred, or the specific region an event occurred within (user-defined).

Data may be automatically shared with internal company systems (or external tools and third parties) for further analysis and determination of event status, resolution, etc. over defined API's. This includes consideration for all security and publishing mechanisms. This data may include numerous account specific data elements, as well as multimedia content as obtained via predefined API's. This shared data may be received by existing utility and third party systems before, during, or after event identification and allows for much faster response times than, for example, traditional resources for dispatching trucks to a job site. This associated data may be filtered and analyzed for specific event considerations and types; outages, brand awareness, marketing, customer engagement, etc. This includes the ability to review associated data (post event) for insight, relationships, and the development of future analytics related to event prediction.

By way of the present invention, responses to events and updates from utility and third party systems may be the automatically performed using other event-related data such as customer phone calls, crew information, field worker reports, and first responder information. This includes data associated with the duration, specific location, status, etc. of the specific event as aggregated from data first provided by complex event processing from social media, mobile apps, SMS/MMS, network, weather and utility data.

Technical considerations as relates to the present invention include faster event resolution, optimized customer responses, and tighter integration with social, mobile, and local data sets that can support utility operations and the delivery of associated services. This includes the ability to detect events on social media, mobile apps, and SMS via two communications with customers and related utility provider stakeholders. The invention may be implemented in a software as a service (SaaS) format with its components configured to enhance event realization by providing a cloud based, easily maintained, environment for the mining, processing, responding, and sharing of event data using non-traditional utility means.

In terms of the perspective of the utility provider as user of the present invention, use and operation of one implementation of the present invention is explained as follows. When a user is logged into the web user interface of the present invention, the user may specify, for example, the geographical region and keywords for which they are interested in receiving data. The inventive method uses the API of the appropriate data platform (e.g., Facebook, Twitter, Instagram, or other validated API enabled services) to subscribe to the data set. When the inventive method receives data, such data is first analyzed to verify it meets the user's criteria (i.e., identifies geographical location, that it contains the specified keywords, etc.). The location is either latitude/longitude of the device when the social media post was made or the latitude/longitude of the location that the person making the post marked as their location. If there is no location found, the inventive method will use the coordinates associated with the user's account. The inventive method will verify that the data is within the specified geographical area. Next, the text portion of the data is run through a sentiment classifier and a value of positive, negative or neutral is attached. It should be noted that the classifier was previously trained with sample English sentences that were classified by hand. Then, a web based weather API is used to determine the weather at the location and time of the post.

Both supervised and unsupervised models of the present invention have been used to determine if a post is related to a power outage based on both a post's content and syntax along with pure time and frequency parameters. Using machine learning algorithms that perform automated classification, learning and predictive calculations based on features such as a social media post's content and syntax, it has been possible to effectively filter non-outage-related social media posts from posts that have a high probability of being related to an outage. Additionally, burst detection algorithms have been employed to identify potential outage events based on pure time and frequency parameters; these time and frequency parameters have minimum thresholds in place. Posts that are identified as being highly probable of being true reports of outages are subject to further contextual to attempt to categorize the event by commonly accepted causes for outages (including, for example, "vegetation", "equipment failure", "public accident" and "wildlife") based on a set of keywords for each category. Furthermore, the present invention has been able to include weather conditions and additional grid-level information supplied by electric companies from their local power grid elements into working models of the present invention, based on the availability of the data.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for automatically processing issues pertinent to a utility provider, said method comprising:
collecting data from an online information source and filtering said collected data by keyword association to generate raw social data;
storing said raw social data in a database;
classifying said raw social data in accordance with a text classifier;
providing burst detection among one or more data sets including said raw social data;
extracting at least one identifiable instance of a utility issue from said one or more data sets by way of frequency-based criteria; and reporting at least one actionable solution based upon said identifiable instance.

2. The method as claimed in claim 1, wherein said online information source is selected from one or more social media.

3. The method as claimed in claim 2, wherein said online information source further includes sources of building and real estate information, RSS news feeds, geographical information, weather, mobile phone applications, cell phone text and image messages, network information, or enterprise applications.

4. The method as claimed in claim 3, wherein said utility issue includes at least one operational issue.

5. The method as claimed in claim 4, wherein said at least one operational issue is indicative of a power outage.

6. The method as claimed in claim 3, wherein said utility issue includes at least one customer issue.

7. The method as claimed in claim 6, wherein said at least one customer issue is indicative of consumer sentiment corresponding to said utility provider.

8. The method as claimed in claim 3, wherein said reporting includes a determination of a geographic location of said collected data.

9. The method as claimed in claim 3, wherein said reporting includes a categorization of a type of event corresponding to said collected data.

10. The method as claimed in claim 3, wherein said reporting includes a detection of customer needs corresponding to said collected data.

11. The method as claimed in claim 3, wherein said reporting includes a prediction of likely causes of said utility issue.

12. The method as claimed in claim 3, wherein said reporting includes a creation of damage assessments of said utility issue.

13. The method as claimed in claim 3, wherein said reporting includes identification and validation of weather conditions corresponding to said collected data.

14. The method as claimed in claim 8, wherein said reporting also includes a determination of building type where said utility issue exists.

15. The method as claimed in claim 1, wherein said raw social data stored in said database includes metadata appended thereto and which corresponds to a specific location of said utility issue.

16. The method as claimed in claim 1, further including sharing said at least one identifiable instance of a utility issue with a third party.

17. A computer program product stored in a non-transitory computer readable medium for processing instances of utility issues across a network, said computer program product comprising software instructions which, when run on said network causes said network to:
   collect data from an online information source and filtering said collected data by keyword association to generate raw social data;
   store said raw social data in a database within said network;
   classify said raw social data in accordance with a text classifier;
   provide burst detection among a data set including said raw social data;
   extract at least one identifiable instance of a utility issue from said one or more of said data sets by way of frequency-based criteria; and
   report at least one actionable solution based upon said identifiable instance via a user interface of said network.

18. The computer program product as claimed in claim 17, wherein said online information source is selected from a group consisting of: one or more social media, building and real estate information sources, RSS news feed sources, geographical information sources, weather sources, mobile phone applications sources, cell phone text and image messages sources, network information sources, and enterprise applications sources.

19. The computer program product as claimed in claim 18, wherein said raw social data stored in said database includes metadata appended thereto and which corresponds to a specific location of said utility issue.

20. The computer program product as claimed in claim 19, further including software instructions which, when run on said network causes said network to share said at least one identifiable instance of a utility issue with a third party.

* * * * *